United States Patent
Thum et al.

(10) Patent No.: US 7,838,614 B2
(45) Date of Patent: Nov. 23, 2010

(54) SILOXANE CONTAINING BLOCK COPOLYMERS, PROCESS FOR THEIR PREPARATION AND THEIR USE FOR LUBRICANTS

(75) Inventors: Oliver Thum, Ratingen (DE); Peter Schwab, Essen (DE)

(73) Assignee: Evonik Goldschmidt GmbH (DE)

( * ) Notice: Subject to any disclaimer, the term of this patent is extended or adjusted under 35 U.S.C. 154(b) by 313 days.

(21) Appl. No.: 12/210,348

(22) Filed: Sep. 15, 2008

(65) Prior Publication Data

US 2009/0075851 A1 Mar. 19, 2009

(30) Foreign Application Priority Data

Sep. 15, 2007 (DE) .................. 10 2007 044 148

(51) Int. Cl.
- *C08G 77/42* (2006.01)
- *C08G 77/06* (2006.01)
- *C08G 77/46* (2006.01)
- *C08G 77/445* (2006.01)
- *C08G 77/448* (2006.01)
- *C08G 77/452* (2006.01)

(52) U.S. Cl. .............................. 528/25; 528/10; 528/28; 528/31; 528/208; 525/264

(58) Field of Classification Search ................. 525/264; 528/10, 25, 28, 31, 208
See application file for complete search history.

(56) References Cited

U.S. PATENT DOCUMENTS

| | | | | | |
|---|---|---|---|---|---|
| 3,592,795 | A | * | 7/1971 | Ashby | 528/29 |
| 3,778,458 | A | * | 12/1973 | Morehouse | 556/440 |
| 3,836,560 | A | * | 9/1974 | Prokai | 556/446 |
| 3,947,386 | A | * | 3/1976 | Prokai et al. | 521/112 |
| 4,246,423 | A | * | 1/1981 | Martin | 556/423 |
| 5,643,581 | A | * | 7/1997 | Mougin et al. | 424/401 |
| 5,840,951 | A | * | 11/1998 | Hierstetter et al. | 556/425 |
| 5,869,727 | A | * | 2/1999 | Crane et al. | 556/445 |
| 5,998,650 | A | * | 12/1999 | Schrock et al. | 556/423 |
| 7,754,778 | B2 | * | 7/2010 | Knott et al. | 521/112 |
| 2005/0101757 | A1 | * | 5/2005 | Glasgow et al. | 528/196 |
| 2006/0052253 | A1 | | 3/2006 | Murray | |
| 2006/0128882 | A1 | * | 6/2006 | Ichinohe | 524/588 |
| 2006/0235181 | A1 | | 10/2006 | Lange et al. | |
| 2007/0123599 | A1 | | 5/2007 | Eilbracht et al. | |
| 2007/0149723 | A1 | | 6/2007 | Schwab et al. | |
| 2007/0184006 | A1 | | 8/2007 | Ferenz et al. | |
| 2008/0221276 | A1 | | 9/2008 | Schwab et al. | |
| 2008/0287699 | A1 | * | 11/2008 | Geisberger et al. | 556/479 |
| 2009/0030097 | A1 | * | 1/2009 | Knott et al. | 521/112 |
| 2009/0062459 | A1 | | 3/2009 | Thum et al. | |
| 2009/0093598 | A1 | | 4/2009 | Venzmer et al. | |
| 2009/0136437 | A1 | | 5/2009 | Springer et al. | |
| 2009/0170734 | A1 | | 7/2009 | Schwab et al. | |

\* cited by examiner

*Primary Examiner*—Randy Gulakowski
*Assistant Examiner*—Robert Loewe
(74) *Attorney, Agent, or Firm*—Frommer Lawrence & Haug LLP

(57) ABSTRACT

The invention relates to novel polyester-polysiloxane block copolymers, to a process for their preparation and to the use of these polymers as a base oil or as an additive in lubricants, especially silicone oils.

17 Claims, No Drawings

SILOXANE CONTAINING BLOCK COPOLYMERS, PROCESS FOR THEIR PREPARATION AND THEIR USE FOR LUBRICANTS

This application claims benefit under 35 U.S.C. 119(a) of German patent application DE 10 2007 044 148.9, filed on Sep. 15, 2007.

Any foregoing applications, including German patent application DE 10 2007 044 148.9, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The invention relates to novel polyester-polysiloxane block copolymers and to a process for their preparation. It further relates to the use of these polymers as a base oil or as an additive in lubricants, especially silicone oils.

STATE OF THE ART

Lubricants are used for lubrication and serve to reduce friction and wear, and for force transmission, cooling, damping of vibration, sealing and corrosion protection.

During any movement, there is relative movement between components and hence friction between the surfaces. In order to minimize energy loss and wear, it is therefore necessary to apply a lubricant between the moving components. For lubrication, typically mineral oils, poly-alpha-olefins, native oils (e.g. rapeseed oils), synthetic ester oils, low-viscosity polyglycols and silicone oils are used.

Silicone oils are usually clear, colorless, neutral, odor-free, hydrophobic liquids with a molecular mass of 1000 to 150,000 g/mol, a density of 0.94 to 1.07 g/cm$^3$ and viscosities between 10 and 1,000,000 mPa·s. They have a low surface tension of 21.5 mN/m (at 25° C.) or less. They have permanent thermal resistance under air up to approx. 180° C., and have pour points of −80° C. to −40° C. and boiling points of >200° C.

Silicone oils have good lubricating properties between −60° C. and up to 200° C., but they are worse than those of mineral oils. In particular, conventional lubricant additives developed for mineral oils (for example EP (extreme pressure) additives) are sparingly soluble or completely insoluble in silicone oils.

OBJECT OF THE INVENTION

It was therefore an object of the present invention to provide a lubricant additive for the lubrication of moving parts, which improves the property profile of silicone oil as a lubricant, especially in relation to the coefficient of friction in the boundary lubrication range.

It has now been found that, surprisingly, linear polyester-polysiloxane block copolymers of the general formula (I)

[(—S—P—)$_p$(—S-Q-)$_q$(—S-T-)$_t$]$_r$     (I)

in which the (—S—P—), (—S-Q-) and (—S-T-) units are bonded to one another in any sequence and in which
p=1 to 10,
q=1 to 10,
t=0 to 10,
r=1 to 100, and r*p≧3 and r*q≧3, characterized in that S is a divalent siloxane unit of the general formula (II)

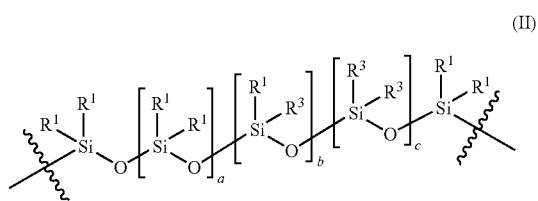

where
N=a+b+c+2=3 to 850,
a=1 to 800,
b=0 to 10,
c=0 to 10,
R$^1$ are the same or different and are each independently selected from the following group: saturated or unsaturated, branched or unbranched alkyl radicals having 1 to 30 carbon atoms, alkaryl or arylalkyl radicals having 7 to 30 carbon atoms, aryl radicals having 6 to 30 carbon atoms,
R$^3$ are independently identical or different radicals of the general formula (IIa)

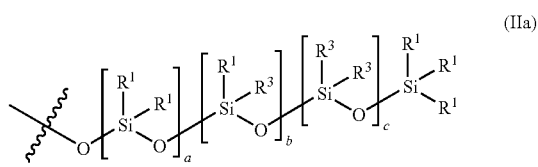

where
a, b, c and R$^1$ are each as defined for formula (I) and
R$^3$=R$^1$ or R$^3$ as defined in formula (I),
P is a divalent polyester unit of the general formula (III)

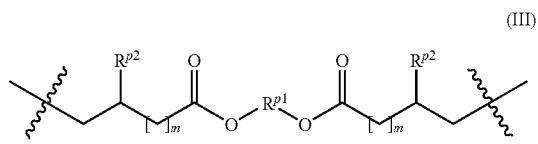

where
R$^{p2}$ is hydrogen or methyl,
m is 0 to 21,
R$^{p1}$ is a divalent organic radical of the general formula (IIIa)

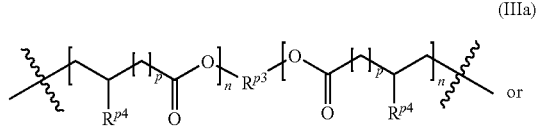

or

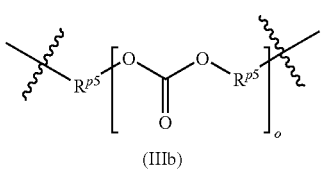

(IIIb)

where n=1 to 100, o=1 to 100, p=0 to 17, $R^{p3}$ is a divalent branched or unbranched, saturated or unsaturated alkyl radical having 2 to 20 carbon atoms, $R^{p4}$ is hydrogen or methyl, $R^{p5}$ is a divalent branched or unbranched, saturated or unsaturated alkyl radical having 2 to 20 carbon atoms, Q is a divalent straight-chain or cyclic, uncharged or positively charged alkyl radical which is optionally interrupted by oxygen atoms and is interrupted at least by one optionally alkyl-substituted nitrogen atom or bears at least one amino group, T is a divalent polyether unit of the general formula (IV)

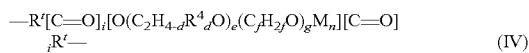

(IV)

where $R^t$ is a divalent linear, branched or cyclic alkyl radical having 2 to 23 carbon atoms, $R^4$ is in each case independently hydrogen or a saturated or unsaturated alkyl radical or aryl radical which has 1 to 22 carbon atoms and may optionally contain oxygen or nitrogen atoms and d is in each case independently 0 to 2, e is 0 to 50, f is 2 to 4, g is 0 to 50, with the proviso that e+g>0, M is the same or different and is a divalent saturated or unsaturated, linear, branched or cyclic hydrocarbon radical which is optionally interrupted by oxygen or nitrogen atoms or carboxyl groups and is optionally substituted, at any position within T, h is 0, 1 or 2 and i is 0 or 1 achieve the stated object and thus satisfy the requirement profile defined above.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right and hereby disclose a disclaimer of any previously described product, method of making the product or process of using the product.

The present invention therefore provides linear polyester-polysiloxane block copolymers, a process for their preparation, their use, and also lubricants which comprise these polyester-polysiloxane block copolymers, as defined in the claims and elsewhere.

The block copolymers of the invention have the advantage that they, as additives, significantly improve the coefficient of friction of silicone oil in the boundary lubrication range.

The polyester-polysiloxane block copolymers of the invention, the process according to the invention for their preparation and their use are described by way of example hereinafter, without any intention that the invention be restricted to these illustrative embodiments. When ranges, general formulae or compound classes are specified hereinafter, these shall encompass not only the appropriate ranges or groups of compounds which are mentioned explicitly but also all subranges and subgroups of compounds which can be obtained by selecting individual values (ranges) or compounds. When documents are cited in the context of the present description, their contents shall be included completely in the disclosure content of the present invention.

In the linear polyester-polysiloxane block copolymers of the invention, of the general formula (I)

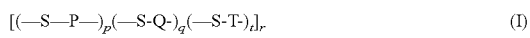

(I)

in which the (—S—P—), (—S-Q-) and (—S-T-) units are bonded to one another in any sequence and in which p=1 to 10, preferably 1 to 3, q=1 to 10, preferably 1 to 3, t=0 to 10, preferably 1 to 3, r=1 to 100, preferably 5 to 20, and r*p≧3 and r*q≧3, S is a divalent siloxane unit of the general formula (II)

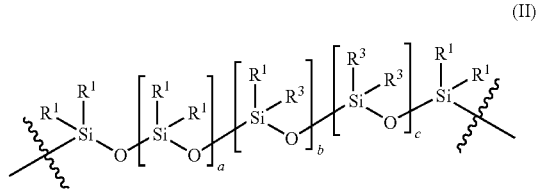

(II)

where

N=a+b+c+2=3 to 850, preferably 6 to 300, more preferably 6 to 100, a=1 to 800, preferably 4 to 300, more preferably 4 to 100, b=0 to 10, preferably 0, c=0 to 10, preferably 0, $R^1$ are the same or different and are each independently selected from the following group: saturated or unsaturated, branched or unbranched alkyl radicals having 1 to 30 carbon atoms, alkaryl or arylalkyl radicals having 7 to 30 carbon atoms, aryl radicals having 6 to 30 carbon atoms, preferably alkyl radicals having 1 to 4 carbon atoms or a phenyl radical, preferably methyl radical, $R^3$ are independently identical or different radicals of the general formula (IIa)

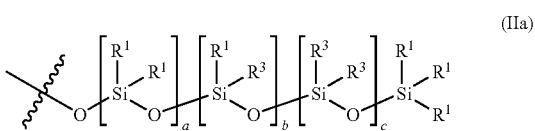
(IIa)

where
a, b, c and $R^1$ are each as defined for formula (I) and $R^3$=$R^1$ or $R^3$ as defined in formula (I),
P is a divalent polyester unit of the general formula (III)

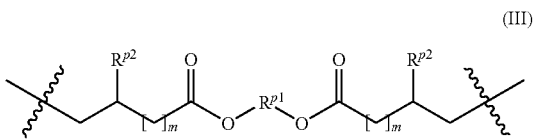
(III)

where
$R^{p2}$ is hydrogen or methyl, preferably hydrogen,
m is 0 to 21, preferably 1 to 19, more preferably 8,
$R^{p1}$ is a divalent organic radical of the general formula (IIIa) or (IIIb)

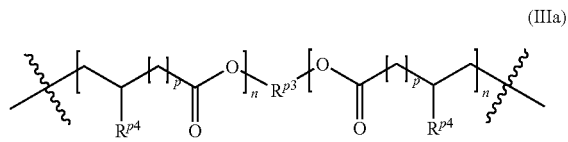
(IIIa)

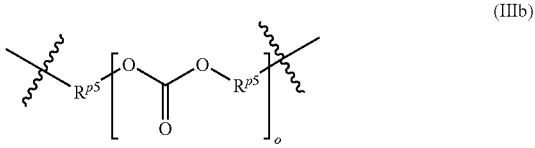
(IIIb)

where
n=1 to 100, preferably 3 to 20,
o=1 to 100, preferably 3 to 20,
p=0 to 17, preferably 2 to 10, more preferably 3,
$R^{p3}$ is a divalent branched or unbranched, saturated or unsaturated alkyl radical (divalent dialkyl radical or alkylene radical) having 2 to 20 carbon atoms,
$R^{p4}$ is hydrogen or methyl, preferably hydrogen,
$R^{p5}$ is a divalent branched or unbranched, saturated or unsaturated alkyl radical (divalent dialkyl radical or alkylene radical) having 2 to 20 carbon atoms,
Q is a divalent straight-chain or cyclic, uncharged or positively charged alkyl radical which is optionally interrupted by oxygen atoms and is interrupted at least by one optionally alkyl-substituted nitrogen atom or bears at least one optionally alkyl-substituted amino group,
T is a divalent polyether unit of the general formula (IV)

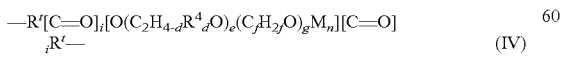
(IV)

where
$R^t$ is a divalent linear, branched or cyclic alkyl radical having 2 to 23 carbon atoms, preferably 3 to 20 carbon atoms, more preferably 3 carbon atoms when i=0 and 10 carbon atoms when i=1, $R^4$ is in each case independently hydrogen or a saturated or unsaturated alkyl radical or aryl radical which has 1 to 22 carbon atoms and may optionally contain oxygen or nitrogen atoms and
d is in each case independently 0 to 2,
e is 0 to 50, preferably 2 to 25,
f is 2 to 4,
g is 0 to 50, with the proviso that e+g>0, preferably >3,
M is the same or different and is a divalent saturated or unsaturated, linear, branched or cyclic hydrocarbon radical which is optionally interrupted by oxygen or nitrogen atoms or carboxyl groups and is optionally substituted, at any position within T,
h is 0, 1 or 2 and
i is 0 or 1.

In another embodiment of the invention,

Q is a divalent straight-chain or cyclic, uncharged or positively charged $C_1$-$C_8$ alkyl radical which is optionally interrupted by oxygen atoms and is interrupted at least by one optionally $C_1$-$C_4$ alkyl-substituted nitrogen atom or bears at least one amino group,
M is the same or different and is a divalent saturated or unsaturated, linear, branched or cyclic $C_1$-$C_8$ hydrocarbon radical which is optionally interrupted by oxygen or nitrogen atoms or carboxyl groups and is optionally substituted, at any position within T.

It is well known to those skilled in the art that the inventive polymers bear end groups. Such end groups are essentially insignificant in relation to their proportion and their influence on the macroscopic properties of the polymer. Normally, the chain ends of the resulting block polymers are independently a monofunctional radical based on one of the S, P, Q or T blocks used. It cannot be ruled out that impurities constitute the end groups, since they do not react further.

Q units preferred in accordance with the invention are selected from the group of units

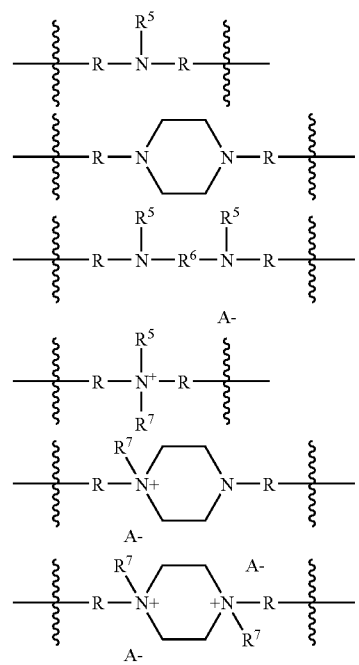

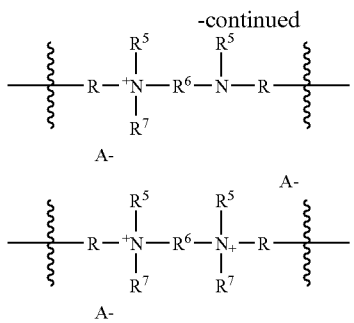

where
R is a divalent straight-chain, branched or cyclic alkyl chain optionally interrupted by oxygen atoms,
$R^5$ is in each case independently alkyl or aryl having 1 to 22 carbon atoms, or a monovalent hydrocarbon radical containing oxygen and/or nitrogen atoms,
$R^6$ is a divalent, optionally branched hydrocarbon radical optionally containing oxygen and/or nitrogen atoms,
$R^7$ is in each case independently hydrogen or alkyl or aryl having 1 to 22 carbon atoms,
$A^-$ is a counterion to the positive charges on the quaternary nitrogen groups, preferably chloride, iodide, sulphate, methylsulphate or ethylsulphate.

In another embodiment of the invention,
R is a divalent straight-chain, branched or cyclic $C_1$-$C_8$ alkyl chain optionally interrupted by oxygen atoms.

Particular preference is given to the Q of the following formula (IX):

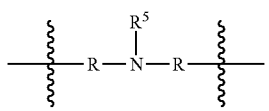

(IX)

in which $R^5$ is a hydrogen or alkyl radical, especially a hydrogen, and R is in each case a propyl or 2-methyl-propyl radical.

T units preferred in accordance with the invention are selected from units of the general formula (IV) where e=0, f=2, g=1 to 50 and h=0. Further preferred T units are selected from units of the general formula (IV) where d=1, e=1 to 50, g=0, h=0 and $R^3$ methyl.

Preferred compounds of the formula (I) are those in which the particularly preferred S, P, Q and/or T radicals are present in combination in each case.

It is well known to those skilled in the art that the inventive compounds are present or may be present in the form of a mixture with a distribution controlled essentially by statistical laws.

The polyester-polysiloxane block copolymers of the invention, of the general formula (I), can be produced in any conceivable manner. Preference is given to preparing the polyester-polysiloxane block copolymers of the invention, of the general formula (I), by the process according to the invention described below.

In the process according to the invention for preparing polyester-polysiloxane block copolymers of the general formula (I), Si—H siloxanes of the general formula (V)

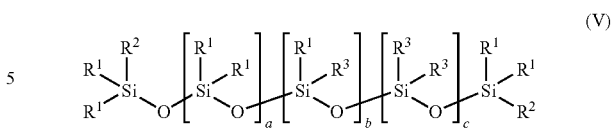

(V)

where
N=a+b+c+2=3 to 850, preferably 6 to 300,
a=1 to 800, preferably 4 to 300,
b=0 to 10, preferably 0,
c=0 to 10, preferably 0,
$R^1$ are the same or different and are each independently selected from the following radicals:
  saturated or unsaturated, branched or unbranched alkyl radicals having 1 to 30 carbon atoms, alkaryl or arylalkyl radicals having 7 to 30 carbon atoms, aryl radicals having 6 to 30 carbon atoms, preferably alkyl radicals having 1 to 4 carbon atoms or a phenyl radical, especially methyl radical,
$R^2$ is hydrogen,
$R^3$ is independently identical or different radicals of the general formula (Va)

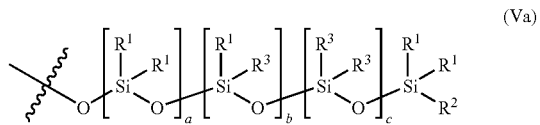

(Va)

where
a, b, c and $R^1$ are each as defined for formula (V) and
$R^3$=$R^1$ or $R^3$ as defined in formula (V) are reacted with dialkenyl compounds of the general formula (VI)

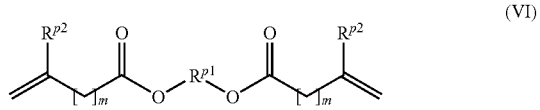

(VI)

where
$R^{p2}$ is hydrogen or methyl, preferably hydrogen,
m is 0 to 21, preferably 1 to 19, more preferably 8,
$R^{p1}$ is a divalent organic radical of the general formula (IIIa) or (IIIb)

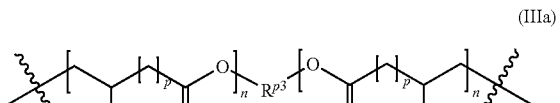

(IIIa)

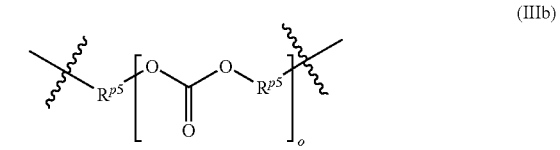

(IIIb)

where
n=1 to 100, preferably 3 to 20, o=1 to 100, preferably 3 to 20,
p=0 to 17, preferably 2 to 10, more preferably 3,
$R^{p3}$ is a divalent branched or unbranched, saturated or unsaturated dialkyl radical (divalent alkyl radical or alkylene radical) having 2 to 20 carbon atoms,
$R^{p4}$ is hydrogen or methyl, preferably hydrogen,
$R^{p5}$ is a branched or unbranched, saturated or unsaturated dialkyl radical (divalent alkyl radical or alkylene radical) having 2 to 20 carbon atoms, with dialkenyl compounds of the general formula (VII)

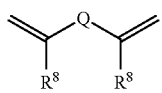
(VII)

where
$R^8$ is in each case independently hydrogen or alkyl or aryl having 1 to 22 carbon atoms, preferably hydrogen or methyl, and
Q is as defined above, and optionally with dialkenyl compounds of the general formula (VIII)

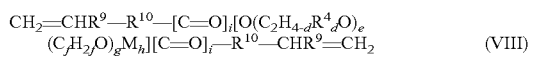
(VIII)

where
$R^{10}$ is a divalent linear, branched or cyclic alkyl radical with 0 to 21, preferably 1 to 18, more preferably 1 when i=0 and 8 when i=1,
$R^9$ is hydrogen or methyl, preferably hydrogen, and
$R^4$, d, e, f, g, M, h and i are each as defined above, by hydrosilylation.

From the group of the α,ω-hydrosiloxanes of the formula (V), preference is given to those having chain lengths of a=10 to 100.

The dialkenyl compounds of the general formula (VII) used are preferably those which have one unit selected from the following units:

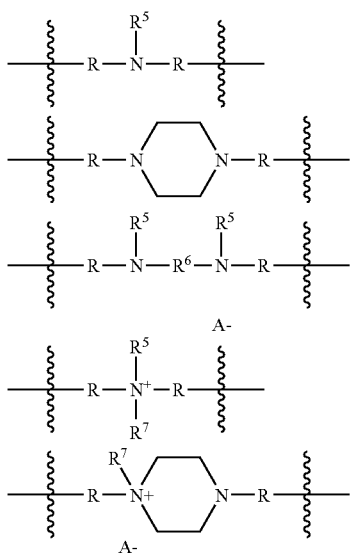

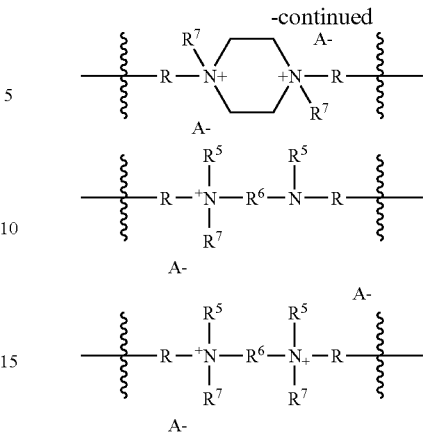

where R, $R^5$, $R^6$, $R^7$ and $A^-$ are each as defined above. Preference is given to using, as the dialkenyl compound of the general formula (VII), diallylamine or dimethallylamine.

The dialkenyl compound of the formula (VI) used is preferably a polycarbonate derivative.

The molar ratio of Si—H siloxanes of the formula (V) and the sum of the dialkenyl compounds of the formulae (VI), (VII) and if appropriate (VIII) in the reaction is preferably 1.3:1 to 0.7:1, preferably between 1.1:1 and 0.9:1, more preferably between 1.03:1 and 0.97:1 and most preferably 1:1.

The reaction can be carried out in the presence or in the absence of a solvent. Preferred solvents are organic solvents, more preferably organic aprotic solvents having boiling points above 80° C. The process according to the invention is preferably performed in the absence of solvents.

The components can be reacted simultaneously or successively. When the reaction is effected successively, the sequence of addition of the components, especially of the compounds of the formulae (VI), (VII) and if appropriate (VIII), can be selected as desired.

The process according to the invention can be carried out continuously or batchwise. Preference is given to performing the process batchwise.

The process according to the invention is preferably carried out in the presence of a catalyst comprising noble metal, preferably platinum. Particular preference is given to performing the process according to the invention in the presence of a platinum-divinyltetra-methyldisiloxane complex (Karstedt catalyst). Such catalysts are obtainable, for example, from Johnson-Matthey. The catalyst content in the reaction mixture is preferably 2 to 100 ppm by mass calculated as noble metal.

It is well known to those skilled in the art that the compounds are present in the form of a mixture with a distribution controlled essentially by statistical laws. The values for the indices a, b, c, n and o are therefore preferably mean values.

It may be necessary or desirable under some circumstances to cap the end groups in order to convert the reactive end groups to inert end groups. This can be done by chemical reactions known to those skilled in the art. For example, at the end of the reaction, the end groups can be determined analytically and saturated by addition of appropriate amounts of monofunctional reactants.

The addition of monofunctional reactants during the reaction can also be utilized in order to control the average chain length of the block copolymer, such that, for example, the viscosity of the end product can be adjusted to the requirements.

It may be advantageous when the resulting reaction product is reacted with an alkylating agent in a further process step in order to quanternize secondary amines present. Preference is given to using, as the alkylating agents, dimethyl sulphate or methyl iodide or methyl chloride.

Compounds of the general formula (V) are, for example, obtainable by equilibration processes known to those skilled in the art, as described, for example, in U.S. Pat. No. 7,196,153 B2.

Compounds of the general formula (VI) can be obtained, for example, by esterifying the corresponding polyester precursors (e.g. Placcel L212AL or Placcel CD 220 from Daicel). Such a process is described, for example, in DE 10 2006 005 100 (U.S. Patent Application Publication 2007-184006) or in Example 5.

Compounds of the general formula (VII) are, for example, commercially available (e.g. diallylamine from Sigma Aldrich) or obtainable by processes generally familiar to those skilled in the art, as described, for example, in JP 10291967. One example of such a process is described in Example 4.

Compounds of the general formula (VIII) can be obtained by processes familiar to those skilled in the art for preparing polyethers. Base-catalyzed processes for polyether synthesis are described, for example, in "'Nonionic Surfactants', van Os, ed.; Marcel Dekker, 1998". DMC-based processes are described, for example, in U.S. Pat. No. 7,005,552. Example 1 describes, by way of example, the preparation of polyethers. Examples 2 and 3 describe their subsequent end-capping with terminally unsaturated halides. Similar processes are known from U.S. Pat. No. 5,567,858. End capping with terminally unsaturated acids is described, for example, in DE 10 2006 005 100.

This invention further provides for the use of the compounds of the general formula (I) and the compounds of the general formula (I) prepared by the process according to the invention or the technical mixtures prepared by this process in lubricants, preferably as an additive in lubricants. The lubricant preferably comprises, as well as compounds of the formula (I), silicone oil.

The present invention likewise provides lubricants which comprise at least one block copolymer of the formula (I). Such lubricants preferably comprise at least one block copolymer of the invention, of the formula (I), and a silicone oil, or consist thereof. More preferably, the inventive lubricant contains 0.01 to 5 parts by mass of block copolymers of the formula (I) and 99.9 to 95 parts by mass of silicone oil, or consists thereof.

The examples adduced below describe the present invention by way of example, without any intention that the invention, whose scope of application is evident from the entire description and the claims, be restricted to the embodiments specified in the examples.

EXAMPLE 1

Preparation of an Allyl Polyether (MW=600, EO content 70%)

58 g of allyl alcohol and KOH were initially charged in a pressure reactor and heated to 120° C. Subsequently, 120 g of styrene oxide were metered in over 3 hours. After a continued reaction time of 1 h, 440 g of ethylene oxide were metered in at 100° C. over 3 hours. After a further continued reaction time of 1 h at 100° C. and cooling to 80° C., the reaction mixture was neutralized with phosphoric acid, filtered and transferred.

EXAMPLE 2

Preparation of a Diallyl Polyether

The allyl polyether prepared in Example 1 (1 mol) was initially charged, and the reactor was degassed at a reduced pressure of 10 to 20 mbar and vented with nitrogen. With ice cooling, 1.5 mol of cold 50% sodium hydroxide solution were added, in the course of which the temperature was not to exceed 25 to 30° C. Thereafter, 1.7 mol of allyl chloride were added dropwise within 90 min. The reaction was highly exothermic. Control of the rate of dropwise addition kept the temperature just below the boiling point of allyl chloride (<45° C.). This formed a pale yellow to orange suspension.

After the addition had ended, the mixture was heated under reflux at 60° C. for one hour. Thereafter, the unconverted allyl chloride was distilled off at 60° C. and a pressure of 100 mbar. The suspension was then filtered.

EXAMPLE 3

Preparation of an Allyl Methallyl Polyether

The allyl polyether prepared in Example 1 (1 mol) was stirred under gentle vacuum with 1 l of a 1M potassium t-butoxide solution in t-butanol at 50° C. for 1 hour, in the course of which the t-butanol was distilled off slowly. Subsequently, 1.5 mol of methallyl chloride were slowly added dropwise and the mixture was reacted at 75° C. for a further 2 hours. Finally, the volatile constituents were distilled off under reduced pressure and the precipitated salt was filtered off. A clear, slightly yellowish liquid was obtained.

EXAMPLE 4

Preparation of a Dimethallylamine

Cocodiethanolamine (1 mol) was stirred under gentle vacuum with 1 l of a 1M potassium t-butoxide solution in t-butanol at 50° C. for 1 hour, in the course of which the t-butanol was slowly distilled off. Subsequently, 1.5 mol of methallyl chloride were slowly added dropwise and the mixture was reacted at 75° C. for a further 2 hours. Finally, the volatile constituents were distilled off under reduced pressure and the precipitated salt was filtered off. A clear, yellow liquid was obtained.

EXAMPLE 5

Preparation of a Difunctional Polyester

A multi-neck round-bottom flask was initially charged with 3.0 mol of PLACELL L212AL polyesterdiol (from Daicel) and 6.0 mol of undecylenoic acid, and heated to 60° C. After adding 120 g of Novozym 435 (Novozymes A/S, Bagsvaerd, Denmark), vacuum was applied (20 mbar) and the water of reaction released was distilled off. After 24 hours, the immobilized enzyme was filtered off. The filtrate afforded the product as a colourless solid without further workup.

EXAMPLE 6

Preparation of a Difunctional Polycarbonate

A multi-neck round-bottom flask was initially charged with 3.5 mol of PLACELL CD220 polycarbonatediol (from Daicel) and 7.0 mol of undecylenoic acid, and heated to 60° C. After adding 200 g of Novozym 435, vacuum was applied (20 mbar) and the water of reaction released was distilled off. After 24 hours, the immobilized enzyme was filtered off. The filtrate afforded the product without further workup as a colourless solid.

EXAMPLE 7

Synthesis of a Block Copolymer

A three-neck flask was initially charged with 2.8 mol of a 1:1:1 molar mixture of the polyether prepared in Example 2, of the dimethallylamine prepared in Example 4 and of the difunctional polyester prepared in Example 5, together with 3 mol of an $\alpha,\omega$-SiH siloxane (N=50, SiH=0.55) and 10 ppm by mass of platinum catalyst (Karstedt catalyst, Johnson-Matthey), and heated to 90° C. with stirring. After 1 h of continued reaction at 120° C., the SiH value was determined and a corresponding amount of the allyl polyether from Example 1 was added, until no SiH value was detectable any longer. The clear product was finally distilled under an oil-pump vacuum (<5 mbar), filtered and transferred.

EXAMPLE 8

Synthesis of a Block Copolymer

A three-neck flask was initially charged with 2.8 mol of a 1:1:1 molar mixture of the polyether prepared in Example 3, diallylamine and of the difunctional polyester prepared in Example 5, together with 3 mol of an $\alpha,\omega$-SiH siloxane (N=50, SiH=0.55) and 10 ppm of platinum catalyst, and heated to 90° C. with stirring and under reflux. After 1 h of continued reaction at 120° C., the SiH value was determined and a corresponding amount of the allyl polyether from Example 1 was added, until no SiH value was detectable any longer. The clear product was finally distilled under an oil-pump vacuum (<5 mbar), filtered and transferred.

EXAMPLE 9

Synthesis of a Block Copolymer

A three-neck flask was initially charged with 2.8 mol of a 1:1:1 molar mixture of the polyether prepared in Example 3, diallylamine and of the difunctional polycarbonate prepared in Example 6, together with 3 mol of an $\alpha,\omega$-SiH siloxane (N=100, SiH=0.55) and 10 ppm of platinum catalyst, and heated to 90° C. with stirring and under reflux. After 1 h of continued reaction at 120° C., the SiH value was determined and a corresponding amount of the allyl polyether from Example 1 was added, until no SiH value was detectable any longer. The clear product was finally distilled under an oil-pump vacuum (<5 mbar), filtered and transferred.

EXAMPLE 10

Synthesis of a Block Copolymer

A three-neck flask was initially charged with 100 ml of toluene, and also 2.8 mol of a 1:1 molar mixture of diallylamine and of the difunctional polyester prepared in Example 5, together with 3 mol of an $\alpha,\omega$-SiH siloxane (N=50, SiH=0.55) and 10 ppm by mass of platinum catalyst (Karstedt catalyst, Johnson-Matthey), and heated to 90° C. with stirring and under reflux. After 1 h of continued reaction at 120° C., the SiH value was determined and a corresponding amount of the hexanol was added, until no SiH value was detectable any longer. The clear product was finally distilled under an oil-pump vacuum (<5 mbar), filtered and transferred.

EXAMPLE 11

Synthesis of a Block Copolymer

A three-neck flask was initially charged with 100 ml of toluene, and also 2.8 mol of a 1:1 molar mixture of the dimethallylamine prepared in Example 4 and of the difunctional polyester prepared in Example 5, together with 3 mol of an $\alpha,\omega$-SiH siloxane (N=50, SiH=0.55) and 10 ppm by mass of platinum catalyst (Karstedt catalyst, Johnson-Matthey), and heated to 90° C. with stirring and under reflux. After 1 h of continued reaction at 120° C., the SiH value was determined and a corresponding amount of the hexenol was added, until no SiH value was detectable any longer. The clear product was finally distilled under an oil-pump vacuum (<5 mbar), filtered and transferred.

EXAMPLE 12

Application Examples

The performance testing was effected with a mini-traction machine (MTM2) obtainable from PCS Instruments, Ltd. (London). This was used to determine the coefficients of friction of the pure block copolymer and of additized silicone oil at different temperatures, high pressures and low rotational speeds (corresponding to boundary lubrication range) and to compare them to unadditized silicone oil. The results obtained are compiled in Table 1.

TABLE 1

| | Force 75 N, speed 10 mm/s | | |
|---|---|---|---|
| | Coefficient of friction at 40° C. | Coefficient of friction at 80° C. | Coefficient of friction at 110° C. |
| Silicone oil | moderate | high | very high |
| Block copolymer of Example 8 | moderate | moderate | moderate |
| Silicone oil + 1% block copolymer of Example 7 | low | low | low |
| Silicone oil + 1% block copolymer of Example 8 | very low | very low | low |
| Silicone oil + | very low | very low | very low |

TABLE 1-continued

| | Force 75 N, speed 10 mm/s | | |
|---|---|---|---|
| | Coefficient of friction at 40° C. | Coefficient of friction at 80° C. | Coefficient of friction at 110° C. |
| 3% block copolymer of Example 8 Silicone oil + 1% block copolymer of Example 9 | very low | very low | low |

The results of the tests show that the inventive block copolymers, as additives, significantly improve the coefficient of friction of silicone oil in the boundary lubrication range.

Having thus described in detail various embodiments of the present invention, it is to be understood that many apparent variations thereof are possible without departing from the spirit or scope of the present invention.

The invention claimed is:

1. Linear polyester-polysiloxane block copolymers of the general formula (I)

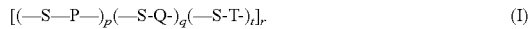

in which the (—S—P—), (—S-Q-) and (—S-T-) units are bonded to one another in any sequence and in which
p=1 to 10,
q=1 to 10,
t=0 to 10,
r=1 to 100,
and r*p≧3 and r*q≧3, characterized in that S is a divalent siloxane unit of the general formula (II)

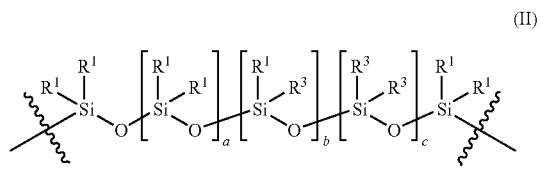

where
N=a+b+c+2=3 to 850,
a=1 to 800,
b=0 to 10,
c=0 to 10,
$R^1$ are the same or different and are each independently selected from the following group: saturated or unsaturated, branched or unbranched alkyl radicals having 1 to 30 carbon atoms, alkaryl or arylalkyl radicals having 7 to 30 carbon atoms, aryl radicals having 6 to 30 carbon atoms,
$R^3$ are independently identical or different radicals of the general formula (IIa)

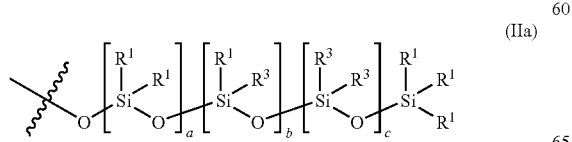

where a, b, c and $R^1$ are each as defined for formula (I) and
$R^3$=$R^1$ or $R^3$ as defined in formula (I),
P is a divalent polyester unit of the general formula (III)

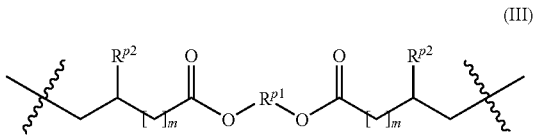

where
$R^{p2}$ is hydrogen or methyl,
m is 0 to 21,
$R^{p1}$ is a divalent organic radical of the general formula (IIIa)

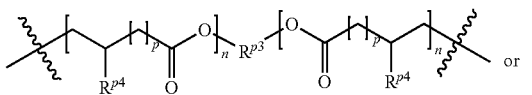

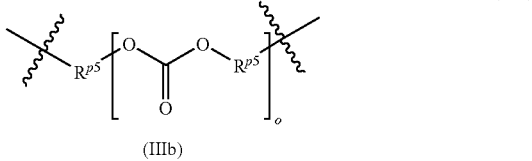

where
n=1 to 100,
o=1 to 100,
p=0 to 17,
$R^{p3}$ is a divalent branched or unbranched, saturated or unsaturated alkyl radical having 2 to 20 carbon atoms,
$R^{p4}$ is hydrogen or methyl,
$R^{p5}$ is a divalent branched or unbranched, saturated or unsaturated alkyl radical having 2 to 20 carbon atoms,
Q is a divalent straight-chain or cyclic, uncharged or positively charged alkyl radical which is optionally interrupted by oxygen atoms and is interrupted at least by one optionally alkyl-substituted nitrogen atom or bears at least one amino group,
T is a divalent polyether unit of the general formula (IV)

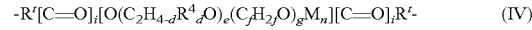

where
$R^t$ is a divalent linear, branched or cyclic alkyl radical having 2 to 23 carbon atoms,
$R^4$ is in each case independently hydrogen or a saturated or unsaturated alkyl radical or aryl radical which has 1 to 22 carbon atoms and may optionally contain oxygen or nitrogen atoms and
d is in each case independently 0 to 2,
e is 0 to 50,
f is 2 to 4,
g is 0 to 50, with the proviso that e+g>0,
M is the same or different and is a divalent saturated or unsaturated, linear, branched or cyclic hydrocarbon radical which is optionally interrupted by oxygen or nitrogen atoms or carboxyl groups and is optionally substituted, at any position within T,
h is 0, 1 or 2 and
i is 0 or 1.

2. Linear block copolymers according to claim 1, characterized in that Q is selected from the group of units

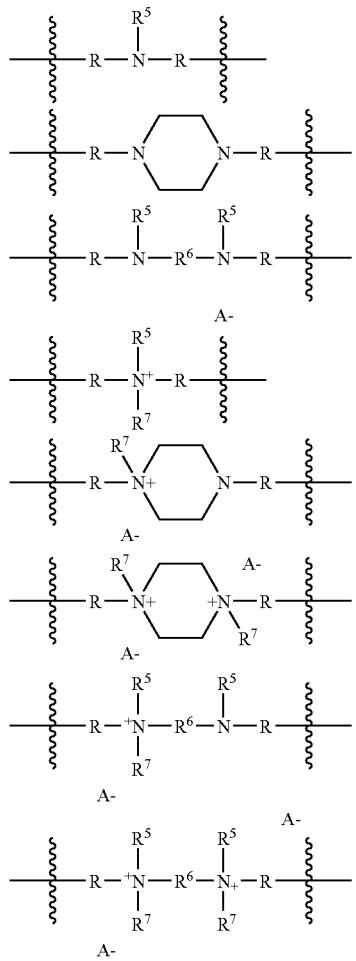

where
R is a divalent straight-chain, branched or cyclic alkyl chain optionally interrupted by oxygen atoms,
$R^5$ is in each case independently alkyl or aryl having 1 to 22 carbon atoms, or a monovalent hydrocarbon radical containing oxygen and/or nitrogen atoms,
$R^6$ is a divalent, optionally branched hydrocarbon radical optionally containing oxygen and/or nitrogen atoms,
$R^7$ is in each case independently hydrogen or alkyl or aryl having 1 to 22 carbon atoms,
$A^-$ is a counterion to the positive charges on the quaternary nitrogen groups.

3. Linear block copolymers according to claim 2, characterized in that Q is selected from units of the formula (IX)

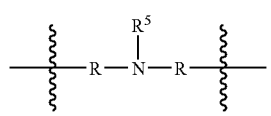 (IX)

where
$R^5$ is a hydrogen or alkyl radical and R is in each case a propyl or 2-methylpropyl radical.

4. Linear block copolymers according to claim 3, characterized in that they have T units where e=0, f=2, g=1 to 50 and h=0, or d=1, e=1 to 50, g=0, h=0 and $R^3$=methyl.

5. Linear block copolymers according to claim 4, characterized in that they have T units where $R^t$=alkyl radical having 3 carbon atoms and i=0, or $R^t$=alkyl radical having 10 carbon atoms and i=1.

6. Linear block copolymers according to claim 1, characterized in that they have T units where e=0, f=2, g=1 to 50 and h=0, or d=1, e=1 to 50, g=0, h=0 and $R^3$=methyl.

7. Linear block copolymers according to claim 1, characterized in that they have T units where $R^t$=alkyl radical having 3 carbon atoms and i=0, or $R^t$=alkyl radical having 10 carbon atoms and i=1.

8. Process for preparing block copolymers of claim 1, characterized in that they are prepared by reacting Si—H siloxanes of the general formula (V)

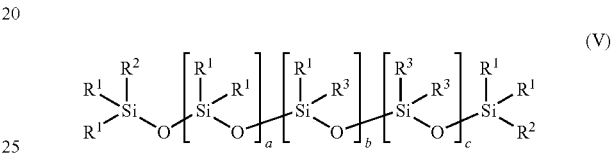 (V)

where
N=a+b+c+2=3 to 850,
a=1 to 800,
c=0 to 10,
d=0 to 10,
$R^1$ are the same or different and are each independently selected from the following radicals:
saturated or unsaturated, branched or unbranched alkyl radicals having 1 to 30 carbon atoms, alkaryl or arylalkyl radicals having 7 to 30 carbon atoms, aryl radicals having 6 to 30 carbon atoms,
$R^2$ is hydrogen,
$R^3$ is independently identical or different radicals of the general formula (Va)

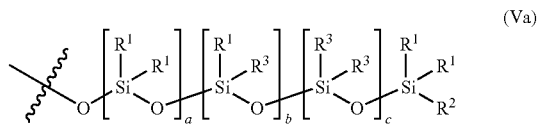 (Va)

where
a, b, c and $R^1$ are each as defined for formula (V) and $R^3$=$R^1$ or $R^3$ as defined in formula (V), with dialkenyl compounds of the general formula (VI)

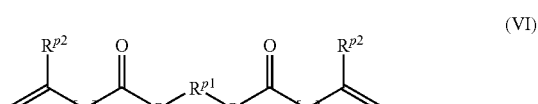 (VI)

where
$R^{p2}$ is hydrogen or methyl,
m is 0 to 21,
$R^{p1}$ is an organic radical of the general formula (IIIa)

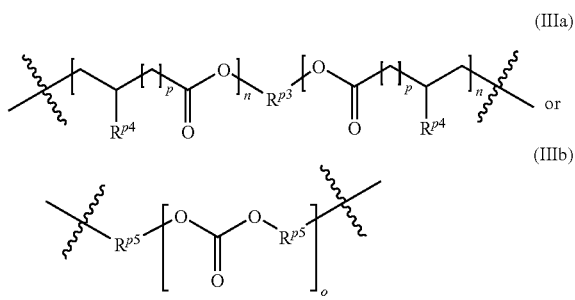

(IIIa) or (IIIb)

where
n=1 to 100,
o=1 to 100,
p=0 to 17,
$R^{p3}$ is a divalent branched or unbranched, saturated or unsaturated alkyl radical having 2 to 20 carbon atoms,
$R^{p4}$ is hydrogen or methyl,
$R^{p5}$ is a divalent branched or unbranched, saturated or unsaturated alkyl radical having 2 to 20 carbon atoms,
with dialkenyl compounds of the general formula (VII)

(VII)

where
$R^8$ is in each case independently hydrogen or alkyl or aryl having 1 to 22 carbon atoms,
Q is a divalent straight-chain or cyclic, uncharged or positively charged alkyl radical which is optionally interrupted by oxygen atoms and is interrupted by at least one optionally alkyl-substituted nitrogen atom or bears at least one optionally alkyl-substituted amino group, and optionally with dialkenyl compounds of the general formula (VIII)

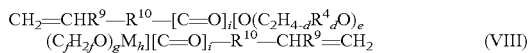
(VIII)

where
$R^{10}$ is a divalent linear, branched or cyclic alkyl radical with 0 to 21,
$R^9$ is hydrogen or methyl and
$R^4$, d, e, f, g, M, h and i are each as defined in claim 1,
in a hydrosilylation.

9. Process according to claim 8, characterized in that the molar ratio of Si—H siloxanes of the formula (V) to the sum of the dialkenyl compounds of the formulae (VI), (VII) and if appropriate (VIII) is 1.3:1 to 0.7:1.

10. Process according to claim 8, characterized in that the compound of the formula (VII) used is diallylamine or dimethallylamine.

11. Process according to claim 8, characterized in that the resulting reaction product is reacted with an alkylating agent in a further process step.

12. Process according to claim 11, characterized in that the alkylating agent is dimethyl sulphate or methyl iodide or methyl chloride.

13. A method of reducing the coefficient of friction in a lubricant which comprises adding the copolymer of claim 1 as an additive to a lubricant.

14. The method of claim 13, characterized in that the lubricant, as well as block copolymers of the formula (I), comprises silicone oil.

15. A lubricant comprising at least one block copolymer according to claim 1.

16. The lubricant according to claim 15, characterized in that it comprises at least one block copolymer of the formula (I) and a silicone oil.

17. The lubricant according to claim 15, characterized in that it contains 0.1 to 5 parts by mass of block copolymers of the formula (I) and 99.9 to 95 parts by mass of silicone oil.

* * * * *